United States Patent [19]

Kong

[11] Patent Number: 5,158,490

[45] Date of Patent: Oct. 27, 1992

[54] DEVICE FOR ASSEMBLING STN LIQUID CRYSTAL MODULE

[75] Inventor: Yunki Kong, Pusan, Rep. of Korea

[73] Assignee: Samsung Electron Devices Co., Ltd., Kyunggi, Rep. of Korea

[21] Appl. No.: 861,536

[22] Filed: Apr. 1, 1992

[30] Foreign Application Priority Data

Apr. 4, 1991 [KR] Rep. of Korea ............... 91-5486

[51] Int. Cl.$^5$ .................. H01J 9/24; H05B 33/10; B23P 19/04
[52] U.S. Cl. .................. 445/66; 29/34 R; 29/739; 29/761; 29/283.5
[58] Field of Search ............ 445/65, 66; 29/34 R, 29/739, 283.5, 761

[56] References Cited

U.S. PATENT DOCUMENTS

| 4,048,718 | 9/1977 | Rote | 29/739 |
| 4,283,845 | 8/1981 | Sigel et al. | 29/739 |
| 4,586,247 | 5/1986 | Murai et al. | 29/739 |

FOREIGN PATENT DOCUMENTS 0236849 6/1986 German Democratic Rep. ... 29/739

Primary Examiner—Richard K. Seidel
Assistant Examiner—Jeffrey T. Knapp
Attorney, Agent, or Firm—Christie, Parker & Hale

[57] ABSTRACT

A device for assembly of an STN liquid crystal module has a Y axis variable rail which is disposed at a crossing direction to an X axis rail and can ride on and slide down the X axis rail installed on the upper side of a table. A Y axis fixed rail is disposed opposite and parallel to the Y axis variable rail. A plurality of lug mounts are slidably disposed on the two Y axis rails. Vacuum pads are positioned at the outside of the two Y axis rails and parallel to each other and move toward or retract from the rails. The pads are at a height corresponding to the height of the upper side of the lug mount plus the thickness of the electromagnetic circuit element and the pads are supported and moved by a first double-acting cylinder. A pair of bars are disposed at a lower position than that of the vacuum pads and move toward or retract from the Y axis rails by using a second double-acting cylinder. A plurality of bending elements are slidably disposed on each bar. The bending element move with the bar and can pass adjacent the side of the grooves formed on the lug mount.

8 Claims, 10 Drawing Sheets

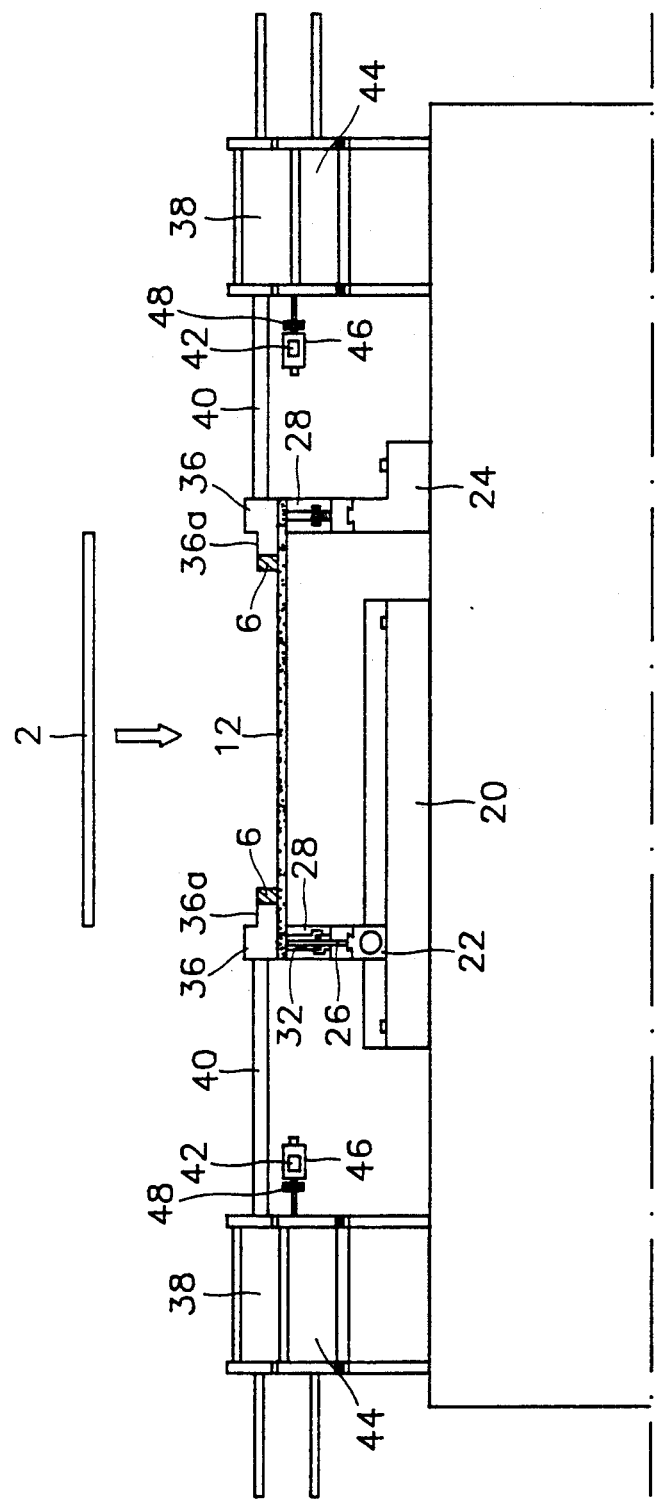

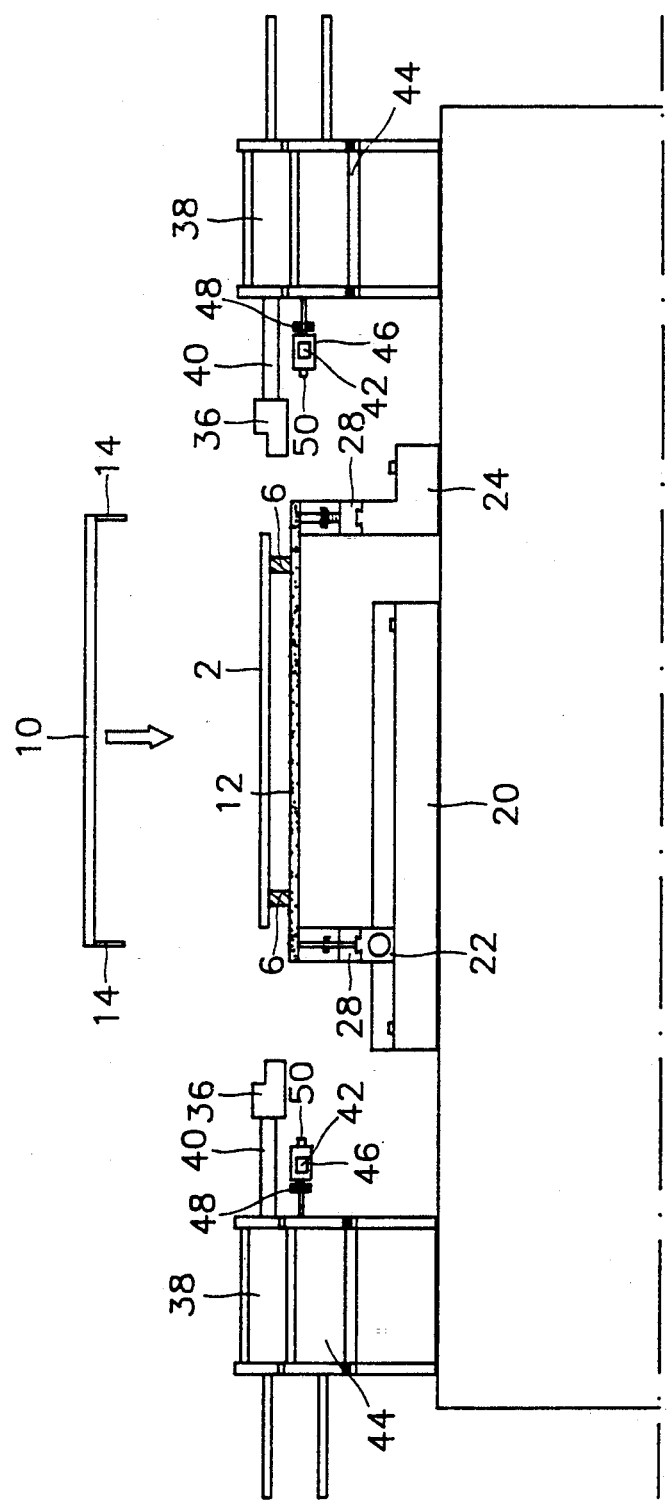

DEVICE FOR ASSEMBLING STN LIQUID CRYSTAL MODULE

FIELD OF THE INVENTION

The present invention relates to a device for assembling a STN(super twisted nematic) liquid crystal module used in a monitors of lap top computers.

BACKGROUND OF THE INVENTION

STN(super twisted nematic) liquid crystal modules has a liquid crystal display element as a display, an electromagnetic circuit element for driving the same and a chassis for assembling them.

FIG. 11 illustrates a conventional STN liquid crystal module structure.

The liquid crystal display element 2 comprises two glass panels united with each other and terminals 4 at opposite edges. More specially, the terminals 4 are conventionally formed at two side ends of display element 2. The liquid crystal element 2 and an electromagnetic circuit element 12 are received in a chassis 10 where a rectangular opening 8 is formed at its center. A conducting means, such as a so called zebra connector 6 is put on the terminal 4 on which circuit element 12 is disposed opposite display element 2. The circuit element 12 is provided with slots 16 through which a plurality of lugs 14 formed on two sides of the chassis at the corresponding portions can penetrate.

FIG. 12 illustrates one liquid crystal module structure obtained by bending, at the direction of the arrows, the portion of the lugs 14 which penetrates each slot 16.

By bending the lugs 14, display element 2 is united with circuit element 12 by chassis 10. The zebra connectors therebetween 6 form an electric path. To assemble them, conventionally, a worker assembles successively display element 2, the zebra connectors 6 and circuit device 12, and then bends, with an appropriate tool, the lugs 14 of chassis 10, penetrating the slots 16 of the electromagnetic circuit element 12, thereby finishing the assembly. Due to the manual assembly method such as described above, even a skilled worker has low productivity, resulting in high cost. Further, the quality of assembled products is not uniform, resulting in an increased reject ratio.

SUMMARY OF THE INVENTION

Accordingly, a feature of the present invention is a device for assembling a STN liquid crystal module of uniform quality by which even an unskilled worker can, with efficiency, assemble and produce a STN liquid crystal module.

To obtain such feature, the present invention, in one aspect, provides an assembly device therefore in which a Y axis variable rail is disposed at a crossing direction to an X axis rail and can ride on and slide down the X axis rail. The X axis rail is installed in two rows on the upper side of a table. A Y axis fixing rail is disposed opposite and parallel to the Y axis variable rail. A plurality of lug mounts having grooves are disposed on two Y axis rails and can slide on the same. Vacuum pads are positioned at the outside of two Y axis rails and are parallel to each other and can selectively move toward each other or away. The vacuum pads are positioned at a height such that their lower face corresponding to the height of the upper side of the lug mount plus the thickness (height) of the electromagnetic circuit element. The first double-acting cylinder supports the pads and moves them. A pair of bars are disposed at a lower position than that of the vacuum pads and selectively move toward and away from the two Y axis rails by a second double-acting cylinder. A plurality of bending elements are disposed on each bar. The bending elements can slide along the bars and can selectively move toward each other or away, such that they will pass adjacent the side of grooves formed on the lug mount.

BRIEF DESCRIPTION OF THE DRAWINGS

Further objects and other advantages of the present invention will be apparent in the following description in connection with the accompanying drawings, in which:

FIGS. 6–10 are views of operation processes of the present invention in which

FIG. 6 is a plan view showing a step of positioning the electromagnetic circuit element on the device;

FIG. 7 is a view showing a step of positioning a zebra connector and a liquid crystal element on the circuit element;

FIG. 8 is a side view of an assembly step for positioning the chassis on the liquid crystal element;

FIG. 9 is a partial enlarged side view of insertion of lugs of the chassis into grooves of a lug mount; and FIG. 10 is a plan view of an example of a step of bending the lugs;

DESCRIPTION OF THE PREFERRED EMBODIMENT

Figure 1:
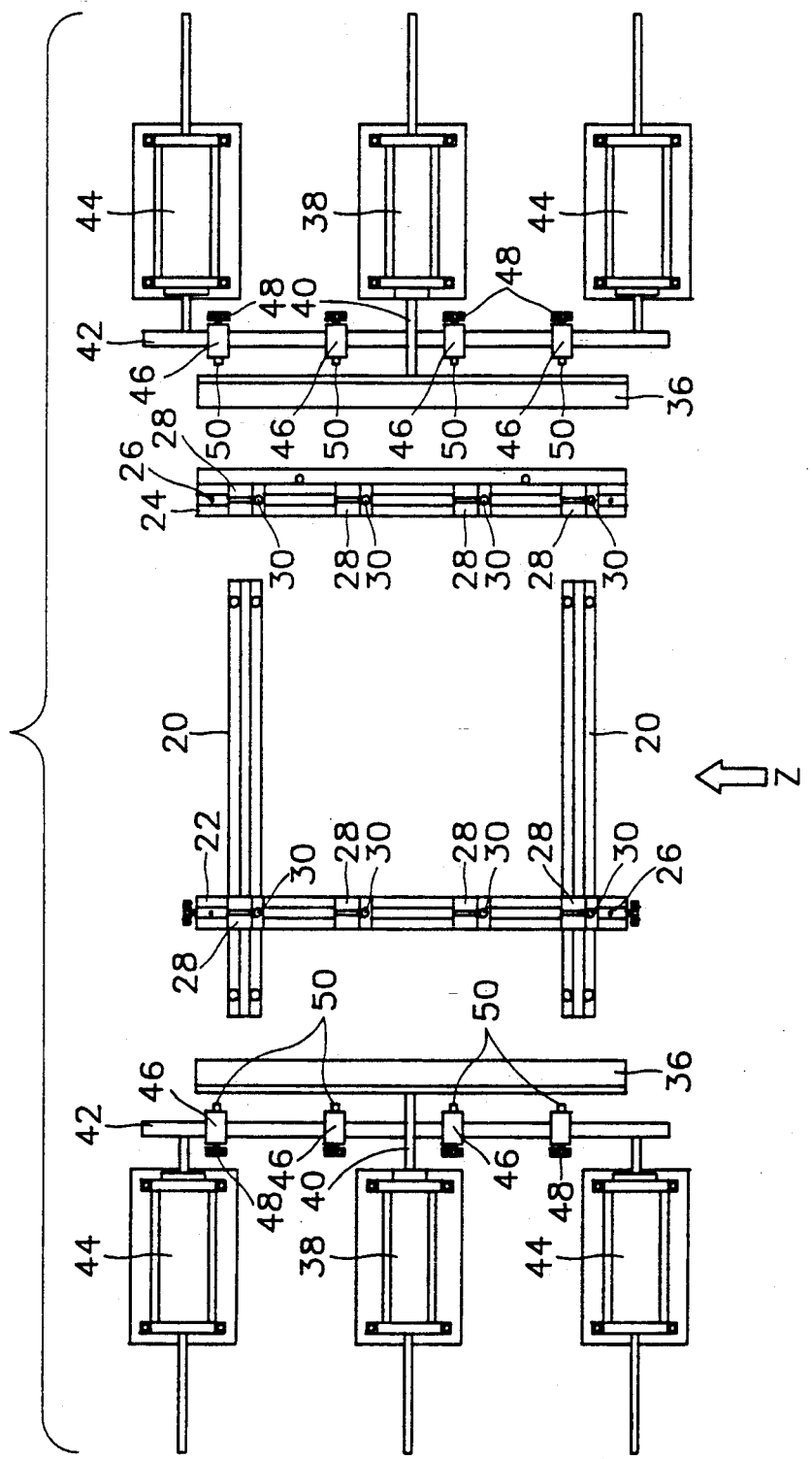
FIG. 1 is a plan view of a device for assembly of an STN liquid crystal module of the present invention.

As shown in FIG. 1, a device for assembling an STN liquid crystal module has several rails. A pair of X axis rails 20 are installed parallel to the upper side of a table. A Y axis variable rail 22 is disposed transverse to the X axis rail 20 and can slide down the same. A Y axis fixed rail 24 is disposed opposite the Y axis variable rail 22.

Base pins 26 are installed at, and extend upright from, one side end of the Y axis variable rail 22 and another side end of the Y axis fixed rail 24, where they are parallel to each other, but diagonally positioned with respect to each other. A plurality of lug mounts 28 are arranged on each Y axis rail 22,24 and can slide down the same.

Figure 2:
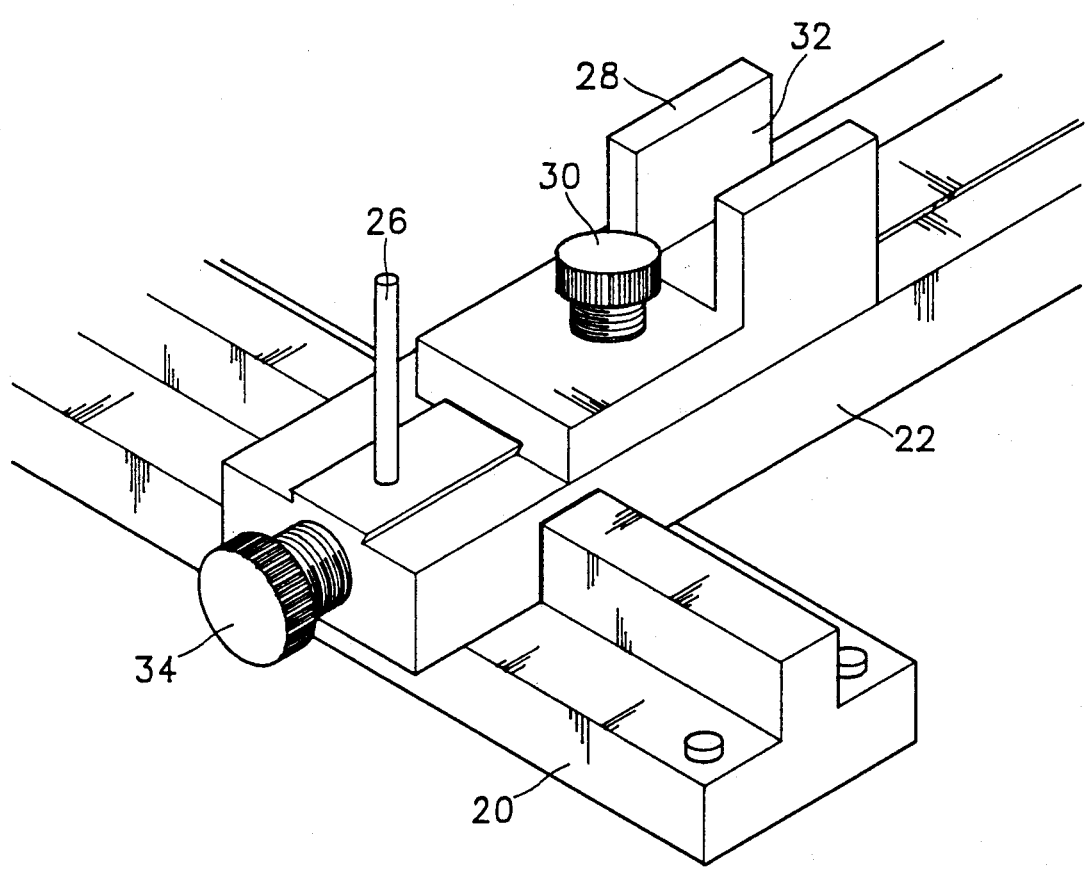
FIG. 2 is a partial enlarged view of an assembly structure of an X axis rail, a Y axis rail, and a lug mount of FIG. 1.

FIG. 2 illustrates, in more detail, lug mounts 28. Each lug mount 28 is installed on the Y axis variable rail 22 with a dovetail joint. The lug mount 28 can be releasably fixed on the Y axis variable rail 22 by a lock bolt 30. That is, grooves 32 formed in the lug mount 28 can be freely positioned on the Y axis variable rail 22. The relationship of the Y axis fixing rail 24 and each lug mount 28 is the same as that of the lug mount and variable rail 22. The Y axis variable rail 22 is releasably fixed on the X axis rail 20 by the lock bolt 34. This bolt is inserted in a hole formed in the edge side. As shown in FIG. 1, vacuum pads 36 are disposed outside of the two Y axis rails 22,24. The vacuum pads 36 are connected to piston rods 40 of first double-acting cylinders 38, respectively, so they can move toward or away from the two Y axis rails 22,24.

Figure 3:
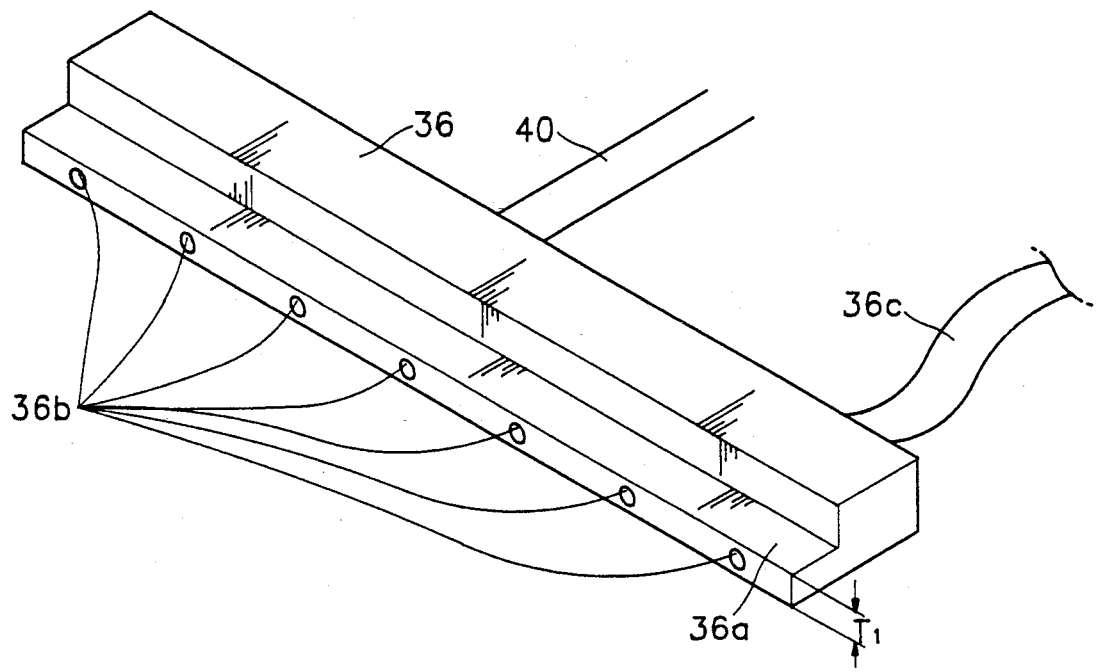
FIG. 3 is a partial enlarged view of a vacuum pad structure of FIG. 1.

FIG. 3 show, in more detail, one vacuum pad structure 36.

Each vacuum pad 36 has a sheet 36a forming a stairway shape at its upper side of its tip or edge portion. In the sheet 36a, a plurality of air inlet holes 36b are formed. The air inlet holes 36b connected are to a vacuum pump(not shown) by a vacuum tube 36c.

Figure 4:
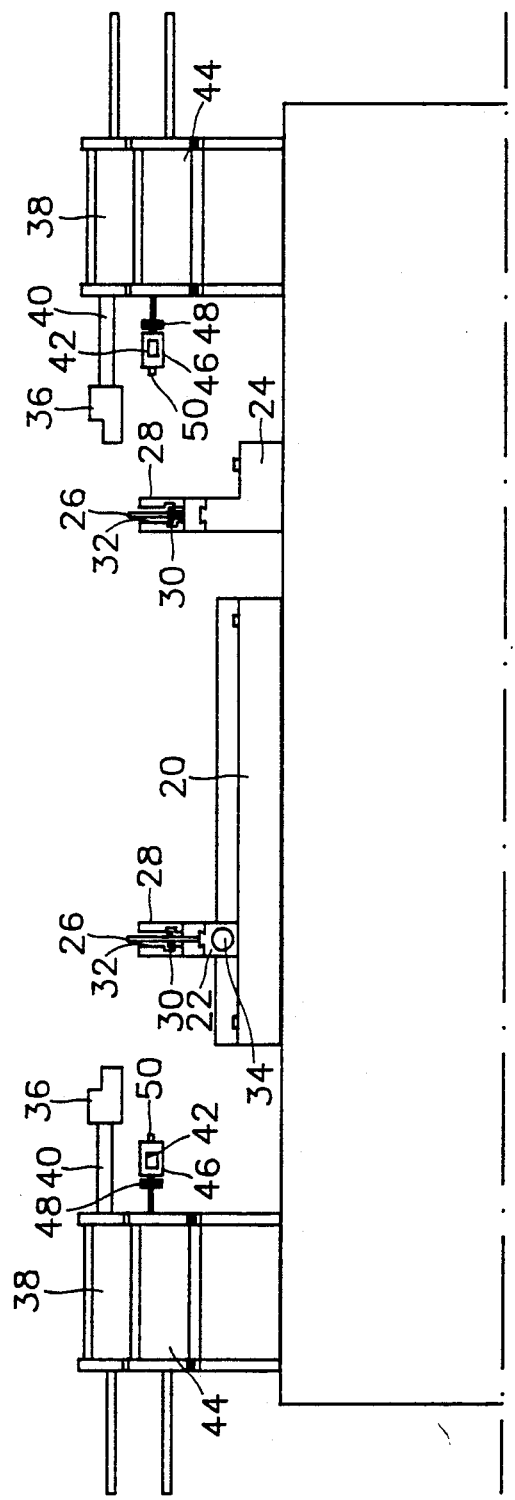
FIG. 4 is a side view of FIG. 1 from the Z direction of arrow Z in FIG. 1.

As shown in FIG. 4, bars 42 are parallel arranged under the vacuum pad 36. The bar 42 can also move toward two Y axis rails 22,24 using a pair of second double-acting cylinders 44.

Thus, the present invention is provided with vacuum pads 36, the first double-acting cylinders 38, and the bars 41 and the second double-acting cylinders in pairs.

Each bar 42 penetrates and supports a plurality of bending means 46 so they can slide down the bar along a length direction. The bending elements 46 can also be releasably fixed on the bar 42 by lock bolts 48.

FIG. 4 further shows that the height of the vacuum pads 36 and the bending elements 46 result in a special relationship with that of the lug mount 28 of the Y axis variable rail 22 and the fixed Y axis rail 24. The height of each vacuum pad 36 is set at the position where its base aligns with the height of the top side of the lug mount 28 plus the thickness of the electromagnetic circuit element 12 when disposed in the device (see FIG. 5), and the height of the bending element 46 is set at the position where their bending contact points or projections can pass close to the side of the groove 32 of the lug mount 28 at the level of the groove.

Figure 5:
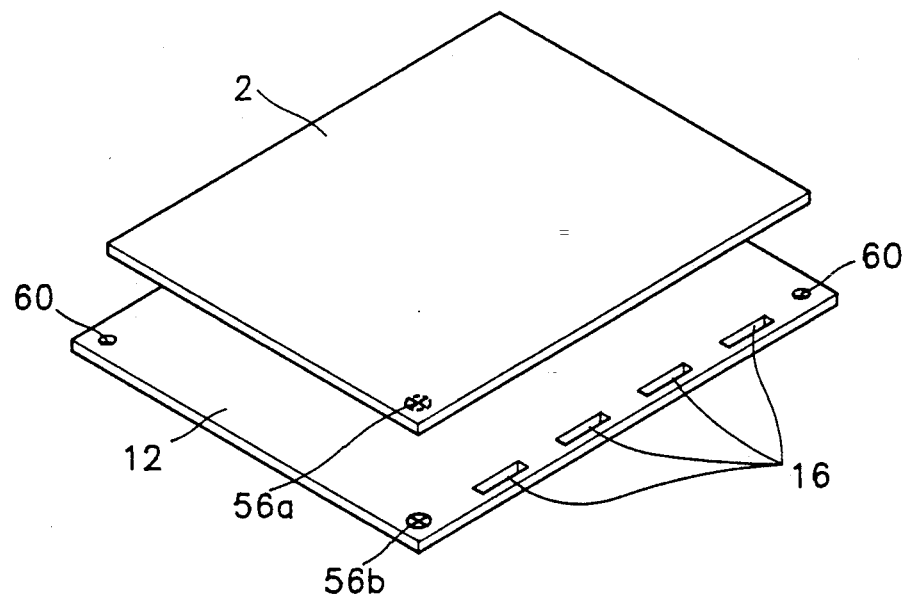
FIG. 5 is an exploded perspective view of a liquid crystal display element and an electromagnetic circuit element for assembly using the present invention.
Figure 11:
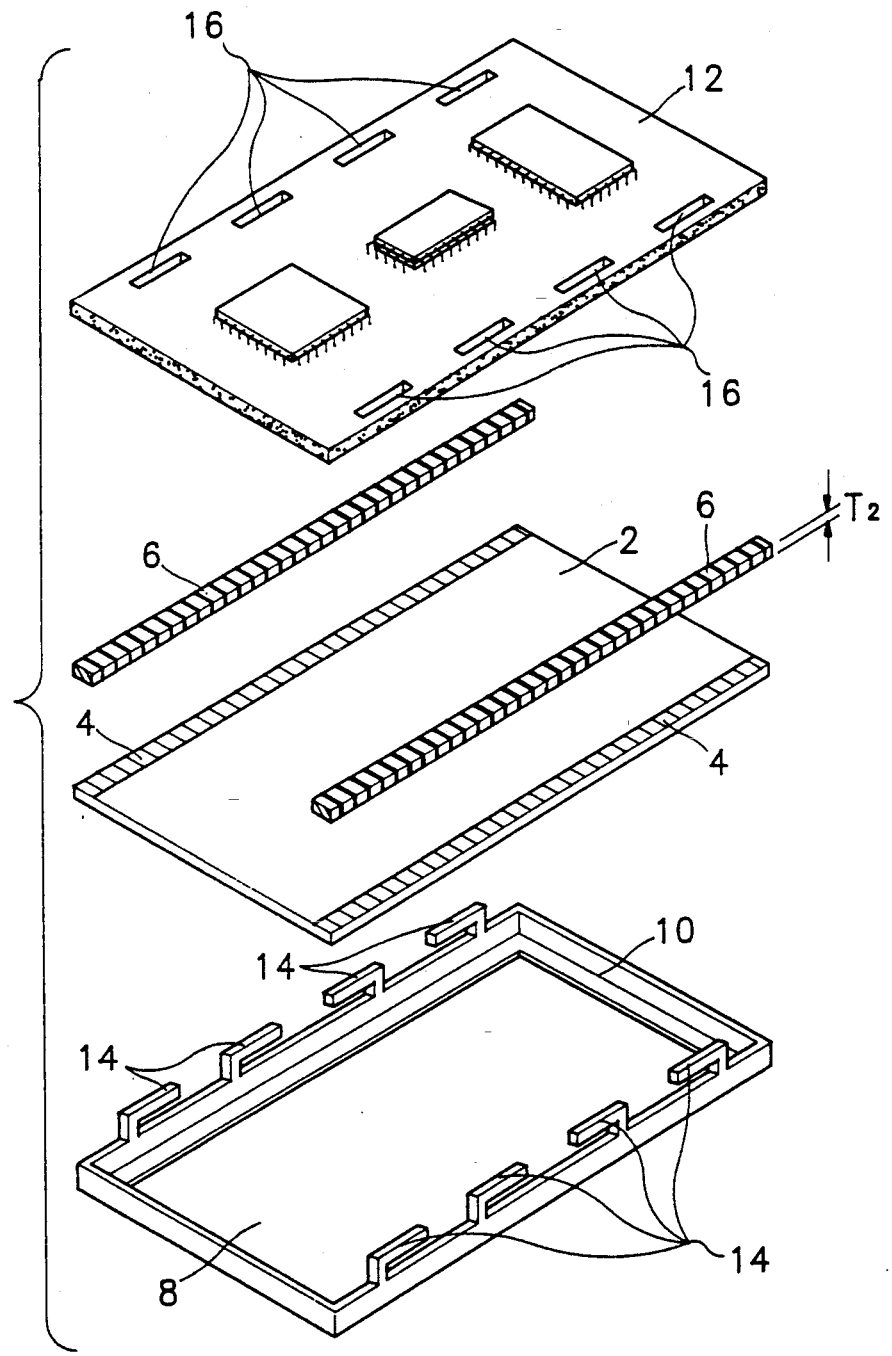
FIG. 11 is an exploded perspective view of a conventional STN liquid crystal module structure.

The device of the present invention is provided with a liquid crystal display element 2 and an electromagnetic circuit element 12 of FIG. 5. They have, basically, the same as the conventional structure of FIG. 11. However, a portion where each of them aligns with each other is provided with registration marks 56a, 56b, and, in the electromagnetic circuit element 12, grooves 60 in which the base pins 26 are inserted are formed at diagonal positions with each other and in line with slots 16 formed on the edge sides.

The assembly process of the STN liquid crystal module according to the device of the present invention is shown in FIGS. 6–10 and will be described as follows.

Figure 6:
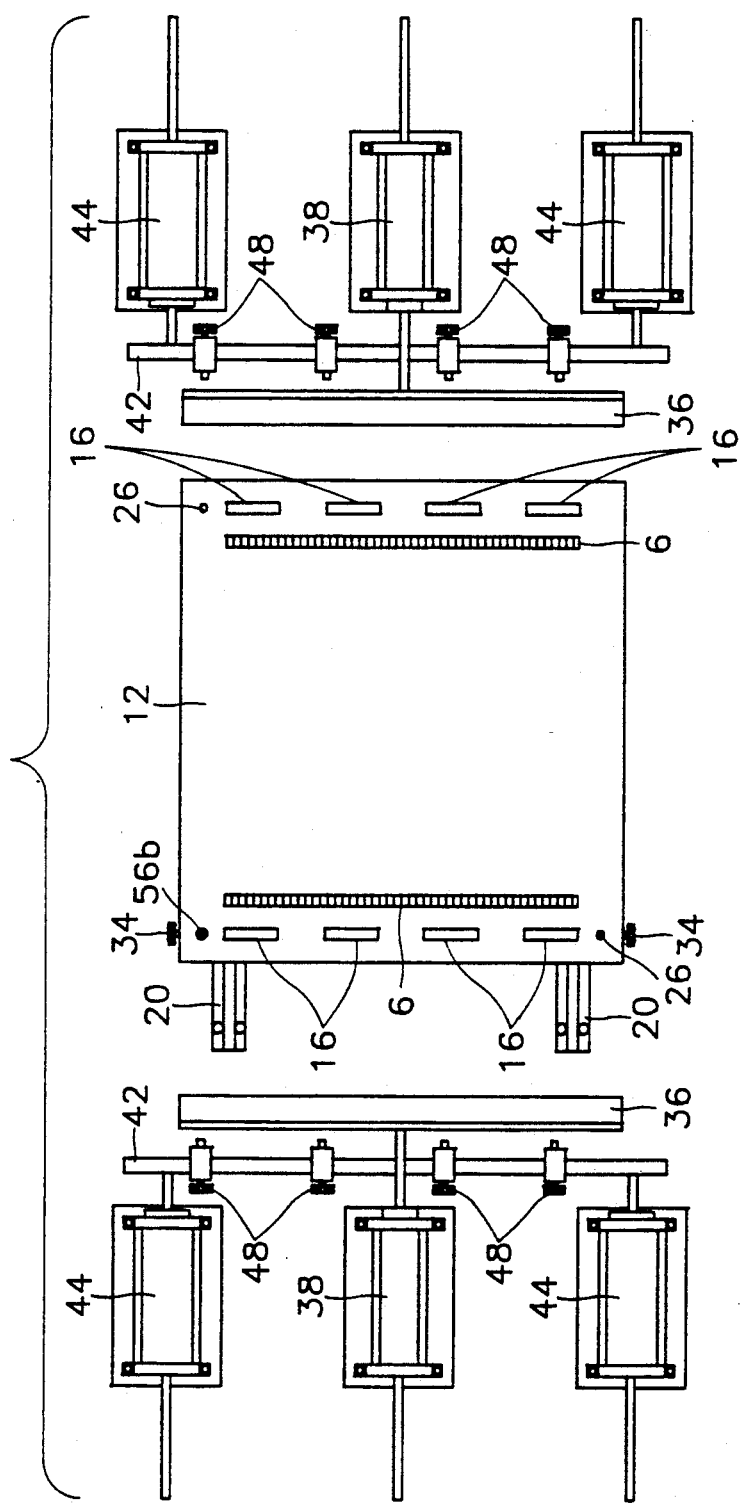

As shown in FIG. 6, the electromagnetic circuit element 12 is put on the Y axis rails 22,24. In the state of FIG. 1, the Y axis variable rail 22 rides on the X axis rail 20 to receive the electromagnetic circuit element, so that a distance between the Y axis variable rail 22 and the Y axis fixing rail 24 is adjusted, as necessary, to accommodate element 12. Also, a plurality of the lug mounts 28 formed on the Y axis rails 22,24 are adjusted so they align with the slots 16 formed on circuit element 12. Circuit element 12 is inserted in the two pins 26 of the Y axis variable rail 22 and the Y axis fixed rail 24 so as to be positioned. As shown in FIG. 5, circuit element 12 has the grooves 60 which can receive its base pins 32. Circuit element 12 is set by a worker.

Zebra connectors 6 are put on the upper side of circuit element 12. By operating the first double-acting cylinders 38, the two vacuum pads 36 move to positions on circuit element 12 to two sides and then absorb and preserve the zebra connectors 6. If necessary, the position of the zebra connectors 6 can be adjusted to square by a worker. The thickness $T_1$ of sheet 36a of vacuum pad 36 of FIG. 3 is preferably the same as, or smaller than, thickness $T_2$ (FIG. 11) of zebra connector 6.

FIG. 7 describes a state such that the zebra connector 6 is drawn and preserved on the upper side of circuit element 12 by vacuum pads 36. The zebra connector 6 is preserved on the terminal 4 of the circuit element. If the size of liquid crystal module or the wire connection pattern of the electromagnetic circuit element varies, the position of zebra connector is easily changed as necessary. As the position of zebra connector 6 is determined by a forgoing stroke, i.e., extension of the piston rods 40, it will be preferable to use a structure in which the piston rod 40 can be activated by the stroke of the first double-acting cylinder 38.

When the vacuum pad 36 has moved forward, display element 2 is put on circuit element 12. After display element 2 is put on the zebra connectors 6, the registration mark 56a (FIG. 5) is positioned to align with mark 56b of circuit element 12. Even during this adjusting of display element 2, the vacuum pads 36 continue to absorb and preserve the zebra connectors 6. The alignment of the marks 56a, 56b is, with preferred precision, preformed by a visible monitoring method which uses a CCD(charge coupled device) camera.

After finishing adjusting display element 2, the vacuum pads 36 stop drawing and preserving the zebra connectors 6. The first double-acting cylinders 38 retract so that the vacuum pads 36 return to the original spot.

FIG. 8 illustrates the process of covering and uniting the assembly with a chassis 10 after positioning display element 2.

Figure 9:
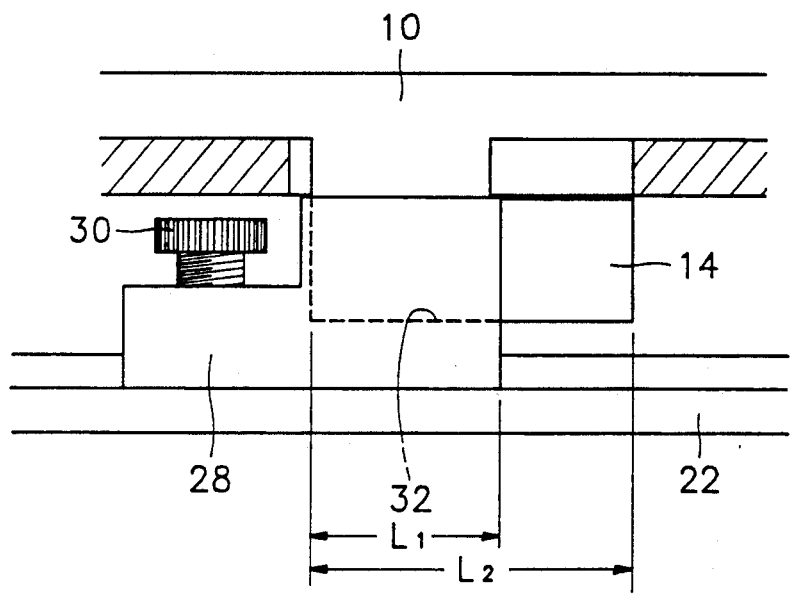
Figure 12:
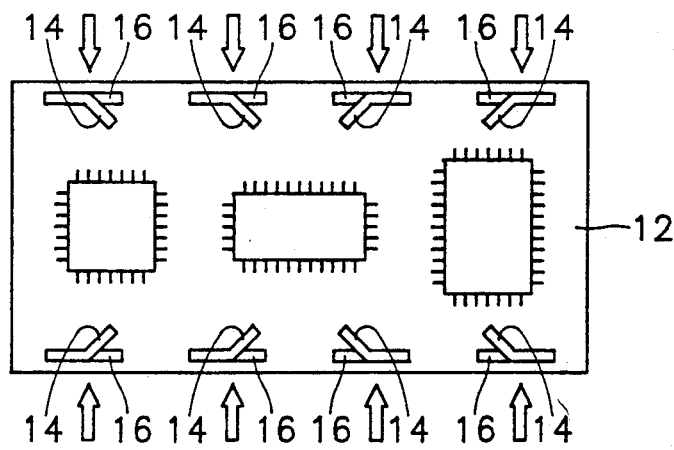
FIG. 12 is a bottom view of a bending lugs of a chassis.

When the vacuum pads 36 retract, the zebra connectors 6 are interposed between the liquid crystal display element 2 and circuit element 12, and then chassis 10 is put on display element 2. Chassis 10, for use in the present invention has lugs 14 which will be inserted in slots 16. Assembly of chassis 10 and circuit element 12 is performed by a worker. The lugs 14 of chassis 10 penetrate the slots 16 and extend to the underside thereof so that, as shown in FIG. 9, they are inserted in grooves of the lug mount 28 to be supported.

The length $L_1$ of each groove 32 is smaller than that $L_2$ of the lug 14, so that a part of the lug 14 extends through the groove and beyond it. After the lug 14 of the chassis 10 penetrates the slot 16 so as to be inserted in the groove 32 of the lug mount 28, each second double-acting cylinder 44 is moved by extending its piston.

Figure 10:
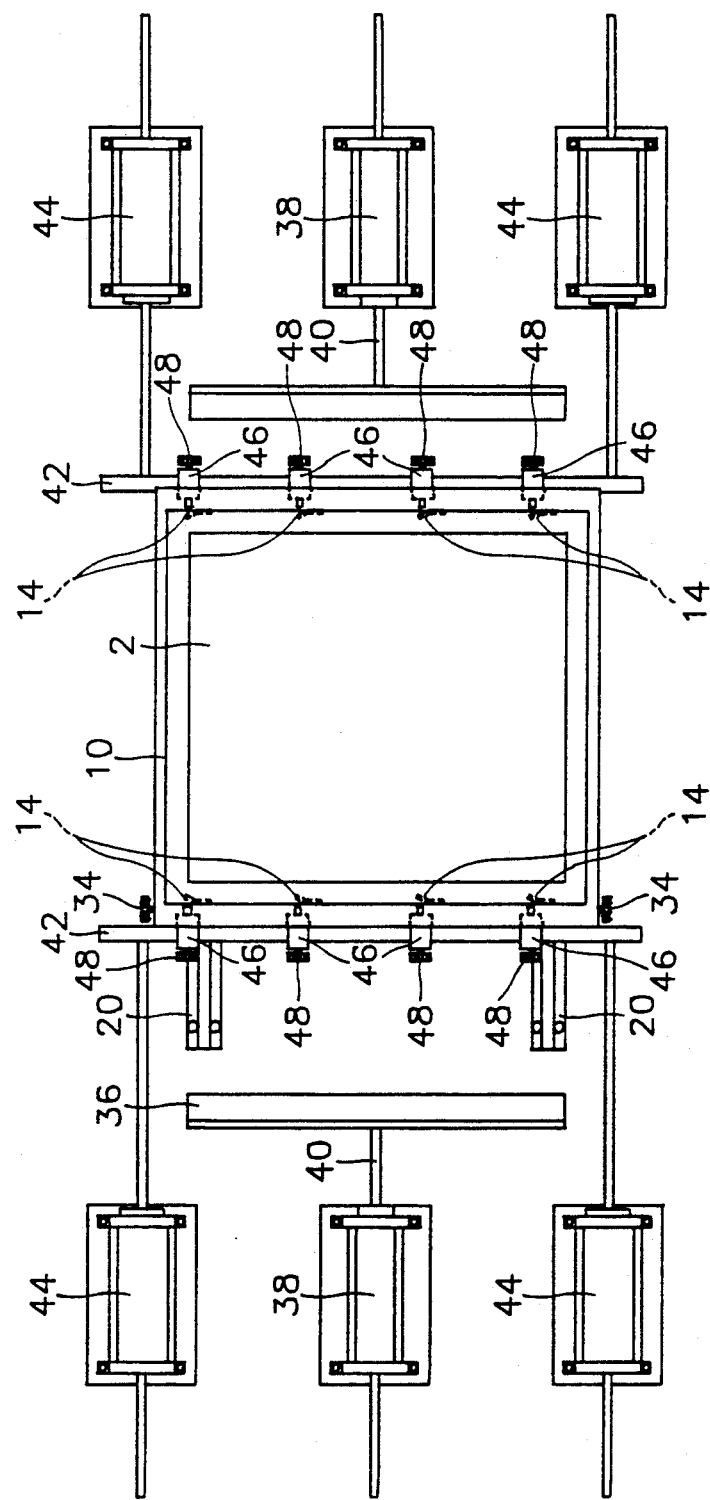

FIG. 10 illustrates a state such that, according to the foregoing operation of the second double-acting cylinder 44, a bending contact point or protrusion 50 formed on the top end side of each bending element 46 arranged on bar 42, by force bends each corresponding lug 14. That is, each bending point 50 presses and bends the free end of the lug 14 where the free end projects outside of groove 32 so that the free end of each lug 14 becomes transverse to and crosses each slot 16 on the base of circuit element 12. As a result, display element 2 and circuit element 12, between which the zebra connector 6 is interposed, are united to each other by the chassis 10 so as to obtain the finished liquid crystal module.

Accordingly, the present invention is such that even an unskilled worker can efficiently, assemble an STN liquid crystal module using the present invention to dispose necessary elements on at a certain position and selectively operate the double-acting cylinder at each assembly step. Also, precision assembly of each element is at more than a predetermined level to obtain the uniform quality and greatly reduce rejects.

What is claimed is:

1. A device for assembling a ,STN liquid crystal module comprising:
   X axis rails disposed on the upper side of a table;
   a Y axis variable rail disposed at a transverse direction to the X axis rails and slidable on the X axis rails;
   a Y axis fixing rail disposed on the table opposite and parallel to the Y axis movable rail;
   a plurality of lug mounts having grooves and being disposed on the Y axis fixed rail and the Y axis movable rail and slidable thereon;
   vacuum pads positioned at the outside of the fixed and movable Y axis rails and parallel to each other;
   first means for supporting the vacuum pads at a position corresponding to a height of an upper side of the lug mounts plus a thickness of an electromagnetic circuit element of the liquid crystal module, and for selectively moving the vacuum pads towards the fixed and movable Y axis rails and away therefrom;
   a pair of bars disposed at a lower position than that of the vacuum pads;
   second means for supporting the bars and for selectively moving the bars towards the fixed and movable Y axis rails and away therefrom;
   a plurality of bending means disposed on each bar for slidable movement thereon and releasably fixable thereto, for movement with each bar, wherein the second means moves the bars toward the fixed and movable Y axis rails such that the bending means moves to positions adjacent to the grooves on the lug mounts.

2. The device as claimed in claim 1, wherein base pins are installed on the ends of the Y axis movable rail and fixed rail and extend upward, the base pins being parallel to each other for engaging corresponding apertures in and determining the position of electromagnetic circuit elements.

3. The device as claimed in claim 1, wherein the lug mounts are installed by a dovetail joint on each of the Y axis rails.

4. The device as claimed in claim 3, wherein the lug mounts are releasably fixed by a lock bolt.

5. The device as claimed in claim 1, wherein the Y axis movable rail is releasably fixed on the two X axis rails by a lock bolt at their side.

6. The device as claimed in claim 1, wherein the vacuum pads are each provided with a sheet having a stepped shape at an upper side of a tip portion thereof and having a plurality of air inlet holes formed therein.

7. The device as claimed in claim 1, wherein each bending means is releasably fixed on the bar by a lock bolt.

8. A device for assembling an STN liquid crystal module comprising:
   a first parallel set of rails disposed on the upper side of a table;
   a second rail disposed at a transverse direction to the first set of rails and slidable on the first set of rails;
   a third rail fixed on the table opposite and parallel to the second rail;
   a plurality of lug mounts having grooves and being disposed on the third rail and the second rail and slidable thereon;
   vacuum pads positioned to the outside of the second and third rails and parallel to each other;
   first means for supporting the vacuum pads and for selectively moving the vacuum pads towards the second and third rails, respectively, and away therefrom;
   a pair of bars disposed at a lower position than that of the vacuum pads;
   second means for supporting the bars and for selectively moving the bars towards the second and third rails, respectively, and away therefrom; and
   a plurality of bending means disposed on each bar for slidable movement thereon and releasably fixable thereto, for movement with each bar, wherein the second means moves the bars toward the second and third rails such that the bending means moves to positions corresponding in height and adjacent to the grooves on the lug mounts.

* * * * *

UNITED STATES PATENT AND TRADEMARK OFFICE
CERTIFICATE OF CORRECTION

PATENT NO. : 5,158,490

DATED : October 27, 1992

INVENTOR(S) : Yunki Kong

It is certified that error appears in the above-identified patent and that said Letters Patent is hereby corrected as shown below:

Column 1, line 7, before "STN" change "a" to -- an --.

Column 1, line 8, before "monitors" delete "a".

Column 1, lines 34,35, change
"zebra connectors therebetween 6" to
-- zebra connectors 6 therebetween --.

Column 1, line 49, before "STN" change "a" to -- an --.

Column 1, line 51, before "STN" change "a" to -- an --.

Column 1, line 65, change "corresponding" to
-- corresponds --.

Column 2, line 43, before "bending" delete "a".

Column 3, line 8, change "show" to -- shows --.

Column 3, line 13, change "connected are" to
-- are connected --.

Column 4, line 66, after "efficiently" delete the comma.

Column 4, line 68, after "elements" delete "on".

UNITED STATES PATENT AND TRADEMARK OFFICE
CERTIFICATE OF CORRECTION

PATENT NO. : 5,158,490

DATED : October 27, 1992

INVENTOR(S) : Yunki Kong

It is certified that error appears in the above-identified patent and that said Letters Patent is hereby corrected as shown below:

In the Claims:

Column 5, line 6, change "a" to -- an --.

Column 5, line 6, before "STN" delete the comma.

Signed and Sealed this

Sixteenth Day of November, 1993

Attest:

BRUCE LEHMAN

Attesting Officer        Commissioner of Patents and Trademarks